United States Patent
Iwahashi et al.

(10) Patent No.: US 12,270,823 B2
(45) Date of Patent: Apr. 8, 2025

(54) AUTOMATED ANALYSIS DEVICE

(71) Applicant: SEKISUI MEDICAL CO., LTD., Tokyo (JP)

(72) Inventors: Kyoichi Iwahashi, Tokyo (JP); Yasuo Minami, Tokyo (JP); Tomohide Asai, Tokyo (JP); Seiichiro Ishioka, Tokyo (JP)

(73) Assignee: SEKISUI MEDICAL CO., LTD., Tokyo (JP)

( * ) Notice: Subject to any disclaimer, the term of this patent is extended or adjusted under 35 U.S.C. 154(b) by 648 days.

(21) Appl. No.: 17/560,281

(22) Filed: Dec. 23, 2021

(65) Prior Publication Data

US 2022/0113332 A1   Apr. 14, 2022

Related U.S. Application Data (63) Continuation of application No. PCT/JP2020/024561, filed on Jun. 23, 2020.

(30) Foreign Application Priority Data

Jun. 24, 2019   (JP) .................... 2019-116086

(51) Int. Cl.
G01N 35/10   (2006.01)

(52) U.S. Cl.
CPC ..... *G01N 35/1016* (2013.01); *G01N 35/1011* (2013.01); *G01N 35/1065* (2013.01); *G01N 35/1081* (2013.01); *G01N 2035/1023* (2013.01)

(58) Field of Classification Search
CPC .... B65H 2701/31; B65H 54/40; B65H 54/44; B65H 67/048; G01N 2035/1023;
(Continued)

(56) References Cited

U.S. PATENT DOCUMENTS 7,171,863 B2   2/2007 Tamura et al.
10,105,852 B2   10/2018 Buchloh et al.
(Continued)

FOREIGN PATENT DOCUMENTS

CN   103562727 A   2/2014
CN   106662593 A   5/2017
(Continued)

OTHER PUBLICATIONS

Extended European Search Report in EP Application No. 20831586.1 mailed Jun. 16, 2023, 8 pp.
(Continued)

*Primary Examiner* — Jennifer Wecker
*Assistant Examiner* — Jonathan Bortoli
(74) *Attorney, Agent, or Firm* — HAUPTMAN HAM, LLP (57) ABSTRACT

There is provided an automated analysis device capable of transferring instruments to be used for an analysis process to a predetermined processing position efficiently and rapidly. In an automated analysis device of the invention, a transfer unit forming a transfer mechanism to transfer instruments to be used for analyte processing into an analyte processing space includes a holding portion to hold the instruments. The holding portion includes a first fitting attachment portion to be attachable to a first instrument in a fitted state, and a second fitting attachment portion to be attachable to a second instrument in a fitted state.

17 Claims, 7 Drawing Sheets

(58) Field of Classification Search
CPC ..... G01N 2035/103; G01N 2035/1051; G01N 35/0099; G01N 35/10; G01N 35/1011; G01N 35/1016; G01N 35/1065; G01N 35/1081

See application file for complete search history.

(56) References Cited

U.S. PATENT DOCUMENTS

| | | | |
|---|---|---|---|
| 2003/0049170 A1* | 3/2003 | Tamura | B01L 3/0275 |
| | | | 422/63 |
| 2014/0087370 A1 | 3/2014 | Maeshima | |
| 2015/0239129 A1 | 8/2015 | Buchloh et al. | |
| 2017/0212138 A1 | 7/2017 | Sakai et al. | |
| 2018/0259545 A1 | 9/2018 | Katsumi et al. | |

FOREIGN PATENT DOCUMENTS

| | | |
|---|---|---|
| EP | 0151981 A2 | 8/1985 |
| JP | H783941 A | 3/1995 |
| JP | H8146010 A | 6/1996 |
| JP | H1194844 A | 4/1999 |
| JP | 200383992 A | 3/2003 |
| JP | 200793285 A | 4/2007 |
| JP | 200826055 A | 2/2008 |
| JP | 2010-078335 A | 4/2010 |
| WO | 2017090780 A1 | 6/2017 |

OTHER PUBLICATIONS

International Search Report in PCT/JP2020/024561, mailed Aug. 18, 2020, 11pp.

Office Action in CN Application No. 202080044285.2 mailed Nov. 22, 2024, 16pp.

Office Action in EP Application No. 20831586.1 dated Jan. 3, 2025, 6pp.

* cited by examiner

AUTOMATED ANALYSIS DEVICE

RELATED APPLICATIONS

The present application is a continuation of International Application No. PCT/JP2020/024561, filed Jun. 23, 2020, which claims priority from Japanese Patent Applications No. 2019-116086, filed Jun. 24, 2019, the disclosures of which applications are hereby incorporated by reference here in their entirety.

TECHNICAL FIELD

The present invention relates to an automated analysis device capable of obtaining measurement information on various analysis items by processing a sample (analyte) such as blood or urine with various reagents, and by measuring the processed sample.

BACKGROUND ART

In the related art, various forms of automated analysis devices such as a blood coagulation analysis device and an analysis and measurement device using immunoassay are known which are capable of obtaining measurement information on various analysis items by processing a biological sample such as blood or urine with various reagents, and by measuring the processed biological sample. For example, an analyte as a biological sample is dispensed from an analyte container into a reaction container, the dispensed analyte is mixed with a reagent according to a measurement item, and various measurements and analyses are performed thereon.

In such an analysis device, for example, instruments such as a nozzle tip to suction an analyte and a reaction container (cuvette) into which the analyte is to be dispensed are used, and generally, the instruments are selectively and individually transferred from a predetermined extraction position to a predetermined processing position in an analyte processing space by corresponding transfer units of a transfer mechanism that is movable in an X-Y direction (for example, refer to Patent Document 1).

CITATION LIST

Patent Document

Patent Document 1: JP 8-146010 A

SUMMARY OF THE INVENTION

Problem to be Solved by the Invention

However, since a plurality of various types of instruments are used for processing in the analyte processing space, an individual transfer of the instruments by the corresponding transfer units of the transfer mechanism results in the individual transfer units moving in the limited analyte processing space in a complicated manner, so that a structure and a transfer step of the transfer mechanism become complicated, the degree of freedom in device design is limited, and the entire analysis process time is also lengthened.

The invention is conceived in light of the above problems, and an object of the invention is to provide an automated analysis device capable of transferring instruments to be used for an analysis process to a predetermined processing position efficiently and rapidly.

Means for Solving Problem

In order to achieve the above object, according to an aspect of the invention, there is provided an automated analysis device to obtain measurement information on a predetermined analysis item by processing an analyte, and by measuring the processed analyte, the device including: a transfer mechanism to transfer instruments to be used for analyte processing in an analyte processing space. A transfer unit forming the transfer mechanism includes a holding portion to hold the instruments as transfer targets, and the holding portion includes a first fitting attachment portion to be attachable to a first instrument in a fitted state, and a second fitting attachment portion to be attachable to a second instrument in a fitted state.

According to the automated analysis device with the above configuration, since the transfer unit forming the transfer mechanism includes the holding portion to hold the instruments, and the holding portion includes the first fitting attachment portion to be attachable to the first instrument in a fitted state, and the second fitting attachment portion to be attachable to the second instrument in a fitted state, the transfer unit can be shared between the first instrument and the second instrument (transfer unit can be shared between a plurality of the instruments), and the instruments can be transferred to a predetermined processing position in the limited analyte processing space efficiently and rapidly. Therefore, a structure and a transfer step of the transfer mechanism can be simplified more, the degree of freedom in device design can be improved more, and the entire analysis process time can be shortened more than the case where instruments are transferred individually by corresponding transfer units of a transfer mechanism.

Incidentally, in the above configuration, it is preferable that the first fitting attachment portion and the second fitting attachment portion are coaxially provided. Accordingly, the first fitting attachment portion and the second fitting attachment portion can be compactly provided in the holding portion. In addition, in this case, in order to facilitate production of the holding portion, it is preferable that the first fitting attachment portion and the second fitting attachment portion are integrally formed.

In addition, in the above configuration, it is preferable that a removal mechanism to remove the instruments to be held by the holding portion is further provided, and in that case, it is preferable that the removal mechanism includes a first removal portion to remove the first instrument to be attached to the first fitting attachment portion, and a second removal portion to remove the second instrument to be attached to the second fitting attachment portion.

According to such a removal mechanism, the removal mechanism can be shared between the first instrument and the second instrument (removal mechanism can be shared between the plurality of instruments), and the efficiency of instrument removal work can be improved. Incidentally, such a removal mechanism may be provided at a predetermined position in the analyte processing space at which the instruments are to be removed, or may be provided in the holding portion itself of the transfer unit. When such a removal mechanism is provided in the holding portion itself, the instruments can be removed at any processing position as needed, and the degree of freedom in device design can also be improved.

Effect of the Invention

According to the invention, there is provided the automated analysis device capable of transferring the instruments to be used for an analysis process to a predetermined processing position efficiently and rapidly.

BRIEF DESCRIPTION OF DRAWINGS

FIGS. 7A and 7B are schematic cross-sectional views illustrating another example of a removal mechanism.

MODE(S) FOR CARRYING OUT THE INVENTION

Hereinafter, an embodiment of the invention will be described with reference to the drawings.

Figure 1:
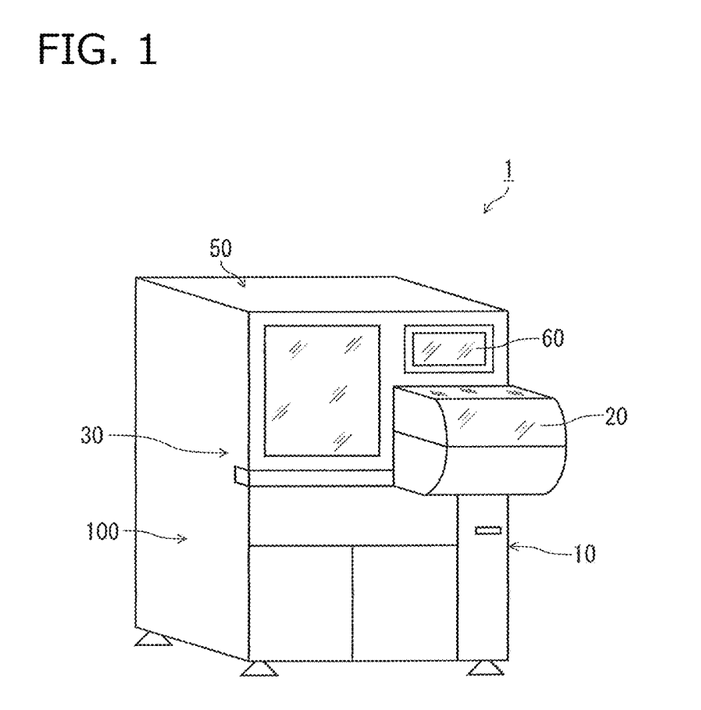
FIG. 1 is an overall schematic exterior view of an automated analysis device according to one embodiment of the invention.
Figure 2:
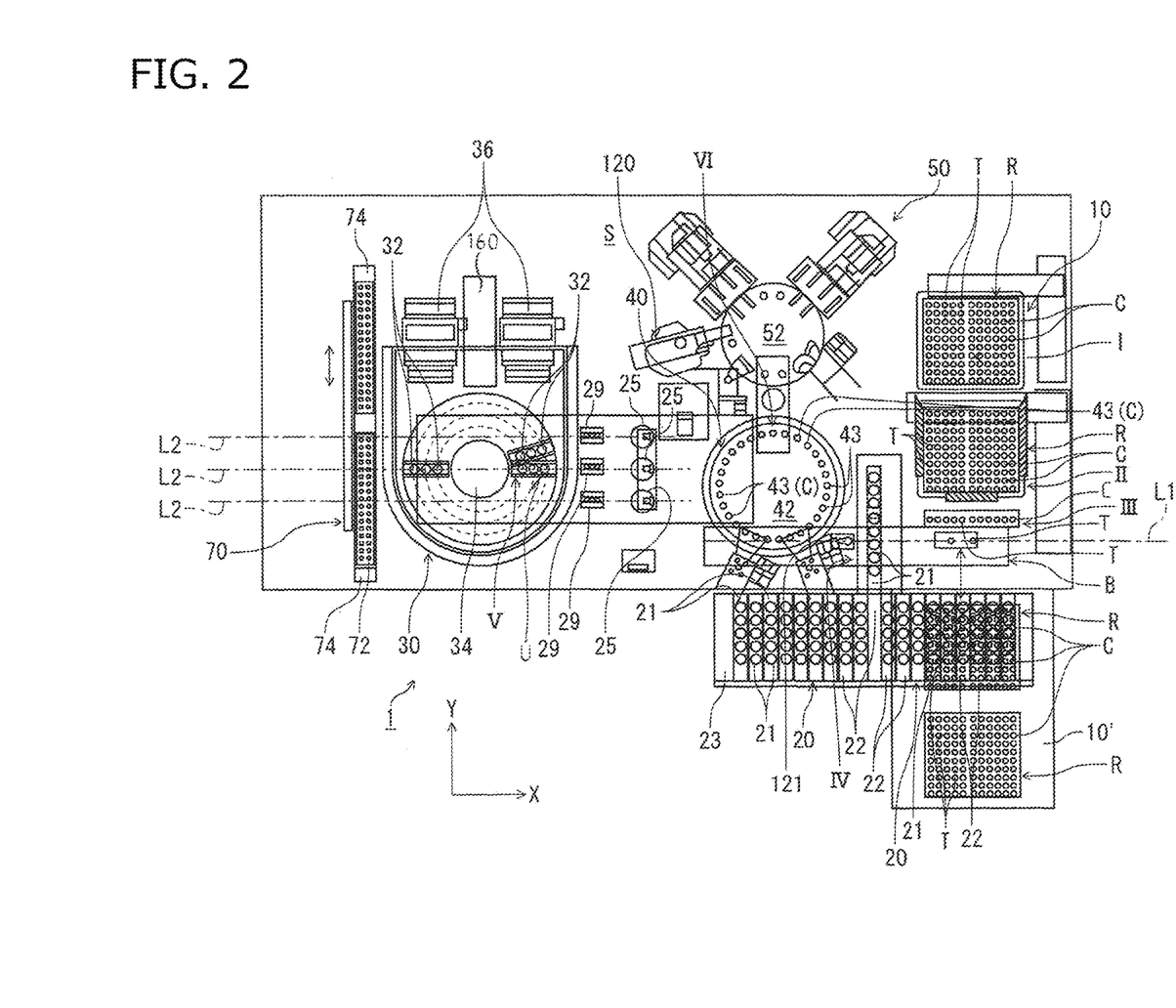
FIG. 2 is a schematic plan view illustrating an internal configuration of the automated analysis device in FIG. 1.

FIG. 1 is an overall schematic exterior view of an automated analysis device of the present embodiment, and FIG. 2 is a schematic plan view illustrating an internal configuration of the automated analysis device in FIG. 1. As illustrated in these drawings, an automated analysis device 1 of the present embodiment includes a conveyance unit 10 to convey a rack; an analyte supply unit 20 to supply a predetermined analyte such as a biological sample; a reagent supply unit 30 to supply a reagent corresponding to a predetermined analysis item; a reaction unit 40 to cause the analyte and the reagent to react with each other; and a processing and measurement unit (in the present embodiment, for example, a B/F separation and measurement unit to be described later) 50 to process the reacted analyte and to measure the processed analyte. The processing units 10, 20, 30, 40, and 50 are disposed inside a housing 100 (refer to FIG. 1). The conveyance unit 10 conveys a rack loaded with a predetermined number of disposable instruments to be used by the automated analysis device 1, for example, in the present embodiment, a rack R in which 60 nozzle tips T to suction the analyte and 60 reaction containers (for example, cuvettes) C into which the analyte is to be dispensed are arranged and held two-dimensionally, to a predetermined instrument extraction position II to be described later.

In addition, the automated analysis device 1 further includes a controller (not illustrated) to control operation of the processing units 10, 20, 30, 40, and 50, and a transfer mechanism (not illustrated) including various transfer units to move in an X-Y direction above the processing units 10, 20, 30, 40, and 50. The transfer mechanism includes, for example, an instrument transfer unit, an analyte transfer unit, a reagent transfer unit, a measurement target transfer unit, etc. The transfer mechanism is capable of grasping an instrument such as the nozzle tip T or the reaction container C using a grasping arm, etc., and moving the instrument in the X-Y direction so as to transfer the nozzle tip T, the reaction container C, etc., or to suction the analyte and the reagent by means of a nozzle. The controller includes a control device body (not illustrated) and a display input unit 60 formed of, for example, a touch panel. Each transfer unit of the transfer mechanism is movable in an X direction and a Y direction in an upper portion inside the housing 100, for example, along rails extending in the X direction and the Y direction, and is further movable (raisable and lowerable) in a vertical direction (Z direction) at a predetermined position.

The conveyance unit 10 conveys a plurality of the racks R loaded with unused nozzle tips T and unused reaction containers C inside the device 1 as follows. First, the plurality of racks R are raised in a vertically stacked state by a lifting mechanism to be conveyed toward a rack standby position (supply side position) I in a space S in which various processing is to be performed on the analyte, etc. in the upper portion inside the housing 100 (hereinafter, simply referred to as a processing space). Thereafter, the racks R are moved from the rack standby position I to an extraction position (retrieval side position) II at which the nozzle tips T and the reaction containers C are to be extracted for analysis and measurement processing, and stand by for a transfer to a tip and reaction container standby position III by the instrument transfer unit. In addition, the racks R that are emptied by extraction of all the nozzle tips T and the reaction containers C are lowered sequentially by the lifting mechanism, and are retrieved.

Specifically, as indicated by an arrow in FIG. 2, an operator can draw the conveyance unit 10 to the outside of the device 1 along the Y direction (conveyance unit that is drawn out is denoted by reference sign 10' in FIG. 2) to retrieve the empty racks R from the conveyance unit 10, and to replenish the conveyance unit 10 with unused racks R loaded with the nozzle tips T and the reaction containers C.

In addition, in the present embodiment, the nozzle tip T and the reaction container C inside the rack R to be located at the extraction position II are held and transferred by a holding portion 84 of an instrument transfer unit 80 to be described later that is one transfer unit of the transfer mechanism, provisionally to be placed at the tip and reaction container standby position III located in the vicinity of the conveyance unit 10. However, in another modification example, the reaction container C may be directly transferred from the rack R to the reaction unit 40, and set by the holding portion of the instrument transfer unit 80 without passing through the tip and reaction container standby position III.

Incidentally, as illustrated in FIG. 2, not only a place for the nozzle tips (position below the standby position III, at which two nozzle tips T and/or reaction containers C are illustrated) but also a place in which an operator can replace each rack including the nozzle tips T and/or the reaction containers C with a hand (position above the standby position III, at which one rack is illustrated) can be provided at the tip and reaction container standby position III.

The analyte supply unit 20 is disposed on an analyte table 23 that is movable along the X direction in FIG. 2, and a plurality of analyte racks 22 each having a box shape are arranged, for example, along a movement direction of the analyte table 23. In addition, each of the analyte racks 22 is loaded with a plurality of analyte containers 21, and each of the analyte containers 21 stores the analyte to be analyzed and measured. Particularly, in the present embodiment, for example, an operation mode is carried out in which the analyte supply unit 20 to be located on a right side in FIG. 2 moves to a left side in FIG. 2 at a predetermined timing in an analysis sequence of the automated analysis device 1, and one analyte rack 22 including the plurality of analyte containers 21 is transferred to an analyte suction position IV between the reaction unit 40 and the tip and reaction container standby position III, and stands by at this position.

Since the tip and reaction container standby position III is provided, a first uniaxial transfer line (analyte transfer line) L1 on which the tip and reaction container standby position III, the analyte suction position IV, and at least a part of the reaction unit 40 are lined up along a straight line is formed in the processing space S. For this reason, a series of operations such as the installation of the analyte suction nozzle to the nozzle tip T, the suctioning of the analyte, and the dispensing of the analyte into the reaction containers can be completed only by a movement of the analyte transfer unit (not illustrated) including an analyte suction nozzle along the first uniaxial transfer line in a uniaxial direction (X-axis direction). Incidentally, the uniaxial direction referred to here means that a movement direction on an X-Y plane which is a transfer direction is uniaxial. After the analyte transfer unit moves in the uniaxial direction on the X-Y plane to reach a desired position, the analyte transfer unit moves in the Z direction (height direction) for an operation to install the nozzle tip or to suction or dispense the analyte, etc. Specifically, first, the analyte suction nozzle (not illustrated) is moved in a positive direction of an X axis (right direction in FIG. 2) by the analyte transfer unit, and the nozzle tip T placed at the tip and reaction container standby position III provisionally is to be connected to a distal end of the analyte suction nozzle (when connected, the analyte suction nozzle is raised and lowered in a Z-axis direction by the analyte transfer unit). Thereafter, the analyte suction nozzle is further moved in a negative direction of the X axis (left direction in FIG. 2) while holding the nozzle tip T at the distal end, suctions the analyte through the nozzle tip T from the analyte container 21 that stands by at the analyte suction position IV, and is further moved toward the reaction unit 40 in the negative direction of the X axis.

At this time, the unused reaction container C placed at the tip and reaction container standby position III provisionally is already transferred to and set in the reaction unit 40 by the instrument transfer unit 80 (refer to FIG. 3) including the holding portion 84, and is on standby. Therefore, the analyte suction nozzle dispenses (discharges) the analyte, which is suctioned through the nozzle tip T, into the reaction container C on the reaction unit 40. Thereafter, the analyte transfer unit moves the analyte suction nozzle in the positive direction of the X axis toward a tip disposal unit 121 located on the first uniaxial transfer line L1 (provided between the reaction unit 40 and the analyte suction position IV), and the used nozzle tip T is separated from the analyte suction nozzle, and is disposed of by the tip disposal unit 121.

The reaction unit 40 includes a rotary table 42 that is to be driven rotationally, and a plurality of reaction container-supporting portions 43 are provided at predetermined intervals over an entire periphery of an outer peripheral portion of the rotary table 42. The unused reaction container C is transferred to and set in the reaction container-supporting portion 43 by the instrument transfer unit 80 including the holding portion 84 as described above. Then, as described above, the analyte is discharged from the analyte suction nozzle into the reaction container C that is rotated to an analyte receiving (dispensing) position by the rotary table 42.

In the reagent supply unit 30, a plurality of reagent storage portions 32 that store reagents corresponding to various types of analysis items are held, for example, in a unit form by a rotary table 34, and the reagent storage portion 32 corresponding to an analysis item in the reaction unit 40 is moved to each corresponding reagent suction position V by rotation of the rotary table 34 (only one reagent suction position is denoted by reference sign V in FIG. 2) located on a second uniaxial transfer line L2 to be described later. The reagent supply unit 30 of the present embodiment includes a plurality of reagent storage units U, and a predetermined number of the reagent storage units U are radially arranged in a circumferential direction of the rotary table 34. Each of the reagent storage units U stores and holds an elongated container unit, in which reagent containers including the plurality (three in the drawing) of reagent storage portions 32 are connected or integrally formed, inside a container holder. In addition, the reagent supply unit 30 further includes a cooling device 36 to cool the reagent, and a reagent container lid opening and closing mechanism 160 to open and close a container lid that opens and closes an opening of each of the reagent storage portions 32 forming the reagent storage unit U.

A conductive tip supply unit 70 is provided outside the reagent supply unit 30, namely, at a position that is adjacent to the reagent supply unit 30 and is opposite the reaction unit 40. The conductive tip supply unit 70 includes a rack 74 loaded with a plurality of conductive tips 72, and connects the conductive tip 72 to a distal end of a reagent suction nozzle as needed when an analysis item is analyzed for which a nozzle is difficult to share with a normal analysis item. Specifically, the conductive tip supply unit 70 moves the rack 74 along the Y direction under position control using a position sensor, to locate the conductive tips 72 on the rack 74 on the second uniaxial transfer line L2 to be described later. Incidentally, a plurality (three in the present embodiment) of nozzle cleaning units 29 to clean the reagent suction nozzle and a plurality (three in the present embodiment) of tip disposal units 25 to dispose of the tip are provided between the reagent supply unit 30 and the reaction unit 40 to be located on the second uniaxial transfer line L2 to be described later.

In a region of the processing space S in which the conductive tip supply unit 70, the reagent supply unit 30, the nozzle cleaning unit 29, the tip disposal unit 25, and the reaction unit 40 are lined up along a straight line, the second uniaxial transfer line (reagent transfer line) L2 is formed on which the reagent transfer unit (not illustrated) for a reagent transfer that is one transfer unit of the transfer mechanism moves only in the uniaxial direction (X-axis direction) along the straight line. Particularly, in the present embodiment, since the three nozzle cleaning units 29 and the three tip disposal units 25 are provided, three second uniaxial transfer lines L2 are also provided (certainly, the number of the second uniaxial transfer lines L2 is not limited to 3, and may be 4 or more or may be 2 or less). Specifically, a holding portion that holds the reagent suction nozzle (not illustrated) is moved only in the X-axis direction along each of the second uniaxial transfer lines L2 by the reagent transfer unit.

Regarding a normal analysis item, the reagent suction nozzle corresponding to each of the second uniaxial transfer lines L2 directly suctions a reagent corresponding to an analysis item from the reagent storage portion 32 to be located at the reagent suction position V on the rotary table 34 through a nozzle suction portion at a distal end of the reagent suction nozzle in the reagent supply unit 30, and thereafter, is moved in the positive direction of the X axis toward the reaction unit 40. At this time, in the reaction unit 40, the reaction container C that has already received the analyte at the above-described analyte receiving position is rotated to a reagent receiving position by the rotary table 42. Therefore, the reagent suction nozzle is capable of dispensing (discharging) the suctioned reagent into the reaction container C. Thereafter, the reagent suction nozzle is moved along the negative direction of the X axis, and is cleaned in the nozzle cleaning unit 29.

On the other hand, in the case where an analysis item is analyzed for which a nozzle is difficult to share with a normal analysis item, for example, when nozzle cleaning alone is not sufficient, the conductive tip 72 may be connected to the distal end of the reagent suction nozzle as needed. In such a case, it is preferable that the conductive tip 72 is connected to the distal end of the reagent suction nozzle in the conductive tip supply unit 70 on the second uniaxial transfer line L2 before the reagent is suctioned in the reagent supply unit 30 (when connected, the reagent suction nozzle is raised and lowered in the Z-axis direction by the reagent transfer unit). When the conductive tip 72 is connected, the reagent suction nozzle is further moved in the positive direction of the X axis while holding the conductive tip 72 at the distal end, and suctions the reagent through the conductive tip 72 in the reagent supply unit 30. The reagent suction nozzle that has suctioned the reagent is further moved in the positive direction of the X axis toward the reaction unit 40, and dispenses (discharges) the reagent into the reaction container C located at the reagent receiving position as described above. Thereafter, the used reagent suction nozzle is moved in the negative direction of the X axis toward a corresponding tip disposal unit 25 of the tip disposal units 25 by the reagent transfer unit, and the used conductive tip 72 is separated from the reagent suction nozzle, and is disposed of by the tip disposal unit 25.

A mixture of the analyte and the reagent dispensed into the reaction container C as described above in the reaction unit 40 is subjected to a reaction on the rotary table 42 at a predetermined temperature for a predetermined time, and thereafter, the reaction container C in which a reaction product is formed is rotated to a reaction container extraction position VI by rotation of the rotary table 42. The reaction container C located at the reaction container extraction position VI is grasped and introduced into the processing and measurement unit 50 by a holding portion (grasping arm, etc.) to be transferred by the measurement target transfer unit (not illustrated) that is one transfer unit of the transfer mechanism.

The processing and measurement unit 50 performs predetermined processing on the introduced reaction product, and executes measurement electrically and optically. Specifically, for example, in analysis and measurement using immunoassay, B/F separation is performed to clean and dispose of a labeled antibody that does not form an immune complex, a cleaning unit and a stirring unit for that purpose and a magnet to be used for the B/F separation are provided, and a measurement unit 120 is also provided which suctions a processed product processed thereby to measure the processed product on a lower side based on electrochemiluminescence. In that case, the processing and measurement unit 50 may be called a B/F separation and measurement unit 50. Incidentally, the used reaction container C on which the measurement is completed is moved to a predetermined position by rotation of a rotary table 52, is grasped by a holding portion to be transferred by a corresponding transfer unit forming the transfer mechanism, and is disposed of by a predetermined disposal unit.

Figure 3:
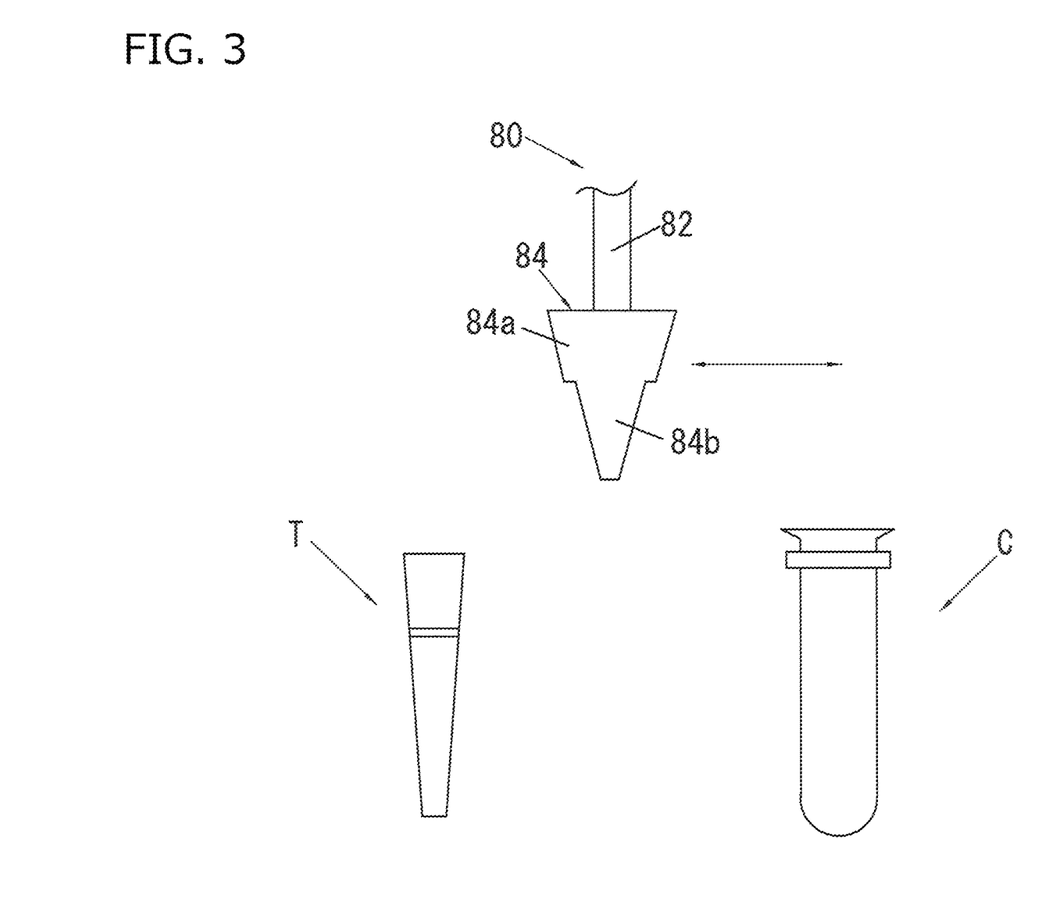
FIG. 3 is a schematic side view illustrating a holding portion of a transfer unit forming a transfer mechanism, and a nozzle tip and a reaction container to be held and transferred by the holding portion.

By the way, in the present embodiment, as described above, the nozzle tip T and the reaction container C inside the rack R to be located at the extraction position II are selectively held by the holding portion 84 to be transferred by the instrument transfer unit 80 forming the transfer mechanism, provisionally to be placed at the tip and reaction container standby position III. FIG. 3 illustrates one example of such an instrument transfer unit 80. As illustrated in the drawing, the instrument transfer unit 80 includes the holding portion 84 to hold the nozzle tip T and the reaction container C selectively, and the holding portion 84 is coupled to a moving body 82 of the instrument transfer unit 80.

In addition, the holding portion 84 includes a first fitting attachment portion 84a to be attachable to the reaction container C as a first instrument in a fitted state, and a second fitting attachment portion 84b to be attachable to the nozzle tip T as a second instrument in a fitted state. In this case, as clearly illustrated in FIG. 4A, the first fitting attachment portion 84a is inserted into the reaction container C from an upper end opening of the reaction container C to fit into an upper end portion of the reaction container C, for example, in a press-fitted state. In addition, as clearly illustrated in FIG. 4B, the second fitting attachment portion 84b is also inserted into the nozzle tip T from an upper end opening of the nozzle tip T to fit into an upper end portion of the nozzle tip T, for example, in a press-fitted state.

Figure 4A:
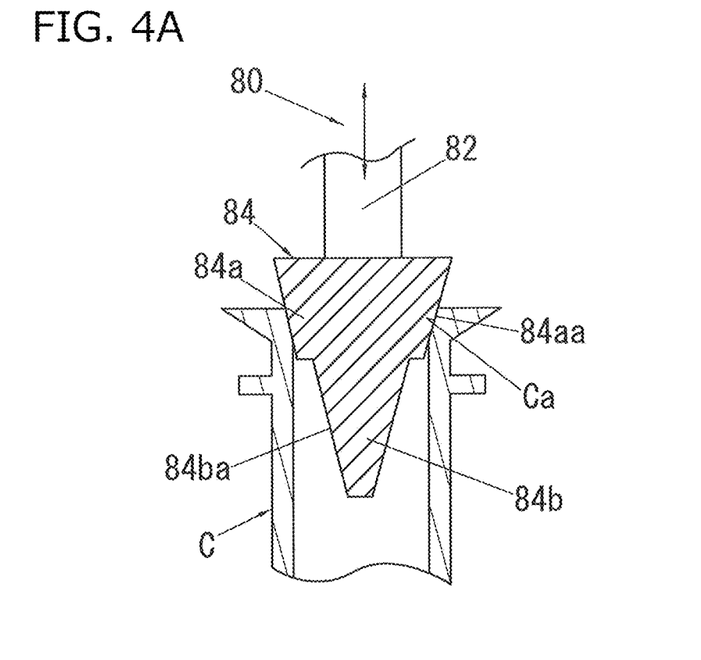
FIG. 4A is a schematic cross-sectional view illustrating a state where the reaction container is held by the holding portion of the transfer unit.
Figure 4B:
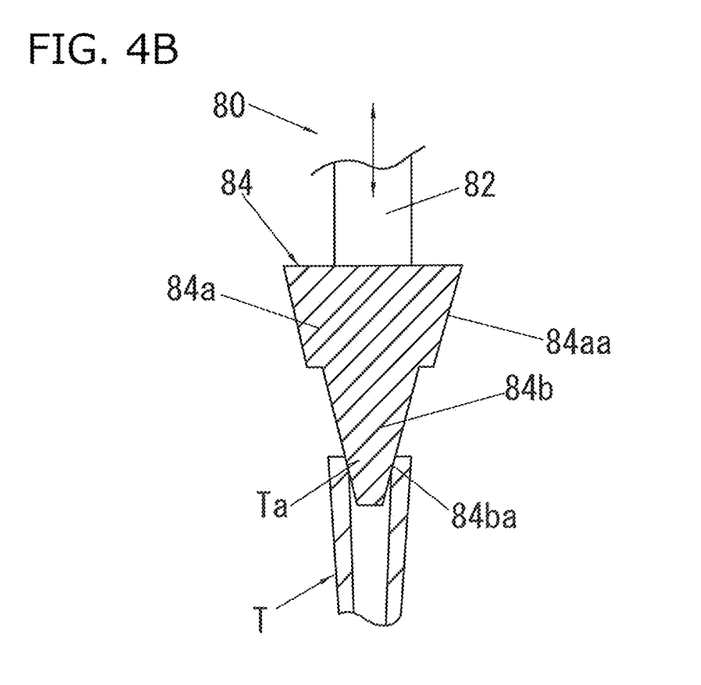
FIG. 4B is a schematic cross-sectional view illustrating a state where the nozzle tip is held by the holding portion of the transfer unit.

Particularly, in the present embodiment, an outer peripheral surface of the first fitting attachment portion 84a is formed as a tapered surface 84aa that tapers off, and an inner peripheral surface of the upper end portion of the reaction container C to fit onto the first fitting attachment portion 84a is formed as a tapered surface Ca that tapers off, thereby facilitating the insertion and fitting of the first fitting attachment portion 84a into the reaction container C. Similarly, an outer peripheral surface of the second fitting attachment portion 84b is also formed as a tapered surface 84ba that tapers off, and an inner peripheral surface of the upper end portion of the nozzle tip T to fit onto the second fitting attachment portion 84b is also formed as a tapered surface Ta that tapers off, thereby facilitating the insertion and fitting of the second fitting attachment portion 84b into the nozzle tip T.

In addition, in the present embodiment, the first fitting attachment portion 84a and the second fitting attachment portion 84b are integrally formed and coaxially provided. In this case, the first fitting attachment portion 84a is provided on a proximal side (upper side) of the holding portion 84, and the second fitting attachment portion 84b has an outer diameter smaller than that of the first fitting attachment portion 84a, and is provided on a distal side (lower side) of the holding portion 84. Therefore, the nozzle tip T and the reaction container C can be selectively held by the fitting attachment portions 84a and 84b only by a vertical movement of the moving body 82.

Figure 5A:
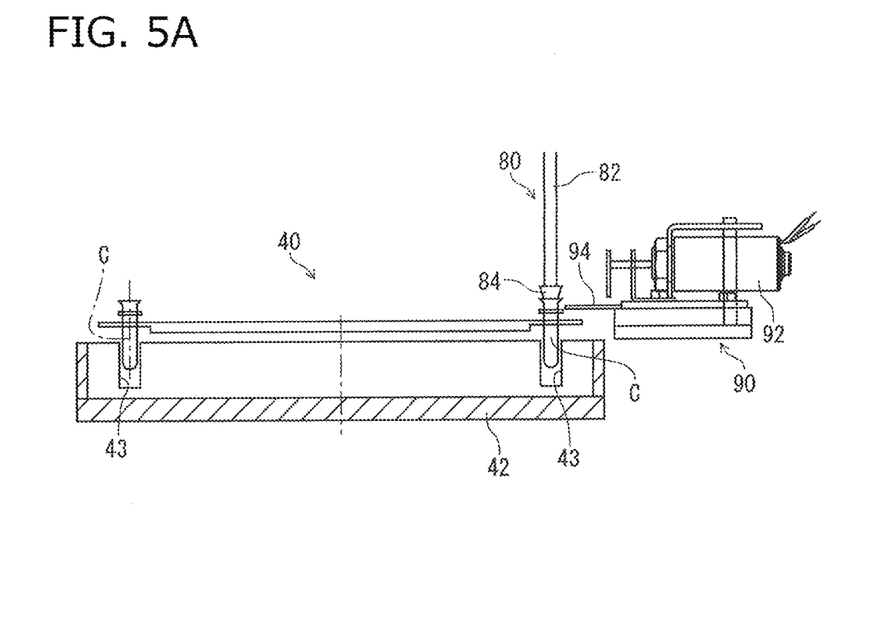
FIG. 5A is a side view illustrating one example of a removal mechanism to remove the reaction container from the holding portion in a reaction unit.
Figure 5B:
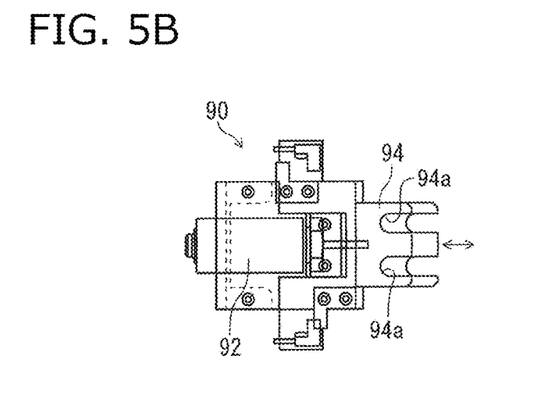
FIG. 5B is a main part plan view of the removal mechanism in FIG. 5A.

In addition, the automated analysis device 1 of the present embodiment also includes a removal mechanism to remove the nozzle tip T and the reaction container C from the holding portion 84. FIGS. 5A and 5B and FIGS. 6A and 6B illustrate one example of such a removal mechanism. A removal mechanism 90 illustrated in FIGS. 5A and 5B is provided at the tip and reaction container standby position III in the reaction unit 40, and removes the reaction container C held by the holding portion 84, to support the reaction container C by the reaction container-supporting portion 43 that is a support groove on the rotary table 42 of the reaction unit 40. Specifically, the removal mechanism 90 includes a slider 94 to move toward a reaction container removal position horizontally when a solenoid 92 is excited. The slider 94 is provided with engagement portions, each of which is capable of engaging a fitting portion of the reaction container C attached to the first fitting attachment portion 84a of the holding portion 84 in a fitted state, for example, a plurality of engagement portions 94a (therefore, capable of engaging a plurality of the reaction containers C simultaneously, that are transferred to the reaction unit 40, and removing the reaction containers C simultaneously: two in the drawing). As a form of removal, for example, when the instrument transfer unit 80 operates to raise the holding portion 84 in the Z-axis direction in a state where the engagement portion 94a of the slider 94 engages the fitting portion of the reaction container C, the reaction container C that is interrupted from being raised by the engagement portion 94a comes off from the first fitting attachment portion 84a to fall to the reaction container-supporting portion 43 therebelow.

Figure 6A:
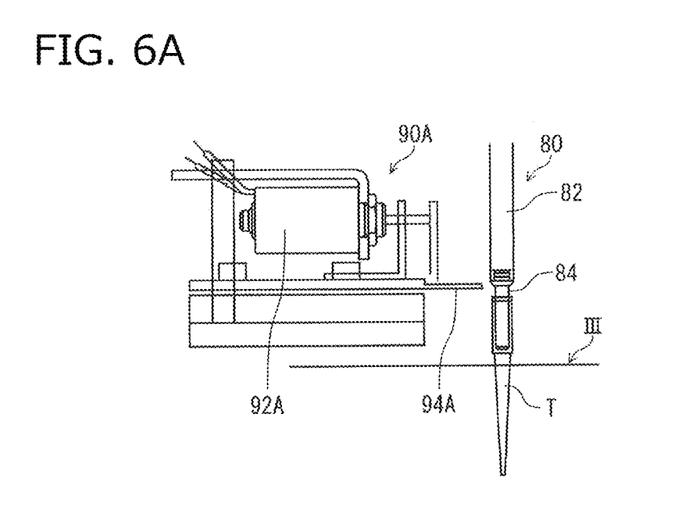
FIG. 6A is a side view illustrating one example of a removal mechanism to remove the nozzle tip from the holding portion at a tip standby position.
Figure 6B:
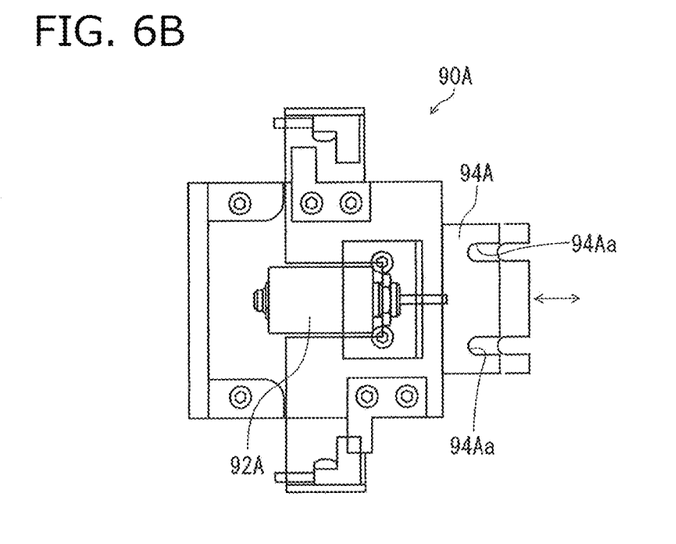
FIG. 6B is a main part plan view of the removal mechanism in FIG. 6A.

On the other hand, a removal mechanism 90A illustrated in FIGS. 6A and 6B is provided at the tip and reaction container standby position III, and removes the nozzle tip T held by the holding portion 84, to hold the nozzle tip T with a tip provisional placement portion at the tip and reaction container standby position III. Specifically, the removal mechanism 90A includes a slider 94A to move toward a tip removal position horizontally when a solenoid 92A is excited. The slider 94A is provided with engagement portions, each of which is capable of engaging a fitting portion of the nozzle tip T attached to the second fitting attachment portion 84b of the holding portion 84 in a fitted state, for example, a plurality of engagement portions 94Aa (therefore, capable of engaging a plurality of the nozzle tips T simultaneously, that are transferred to the tip and reaction container standby position III, and removing the nozzle tips T simultaneously: two in the drawing) (certainly, only one engagement portion 94Aa may be provided). As a form of removal, for example, when the instrument transfer unit 80 operates to raise the holding portion 84 in the Z-axis direction in a state where the engagement portion 94Aa of the slider 94A engages the fitting portion of the nozzle tip T, the nozzle tip T that is interrupted from being raised by the engagement portion 94Aa comes off from the second fitting attachment portion 84b to fall to the tip provisional placement portion therebelow.

Figure 7A:
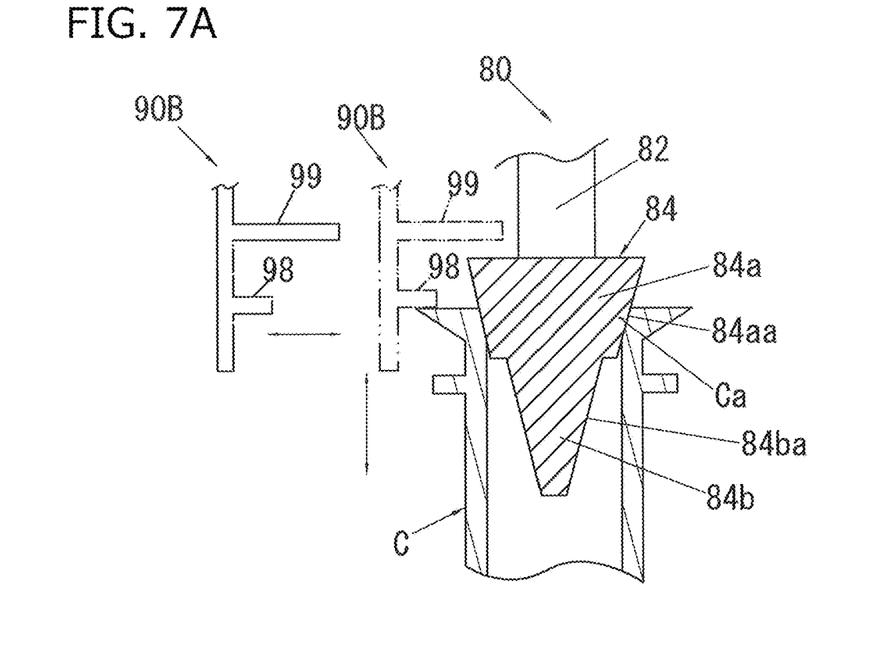
FIG. 7A is a view illustrating a state where a first removal portion removes the reaction container from the holding portion.
Figure 7B:
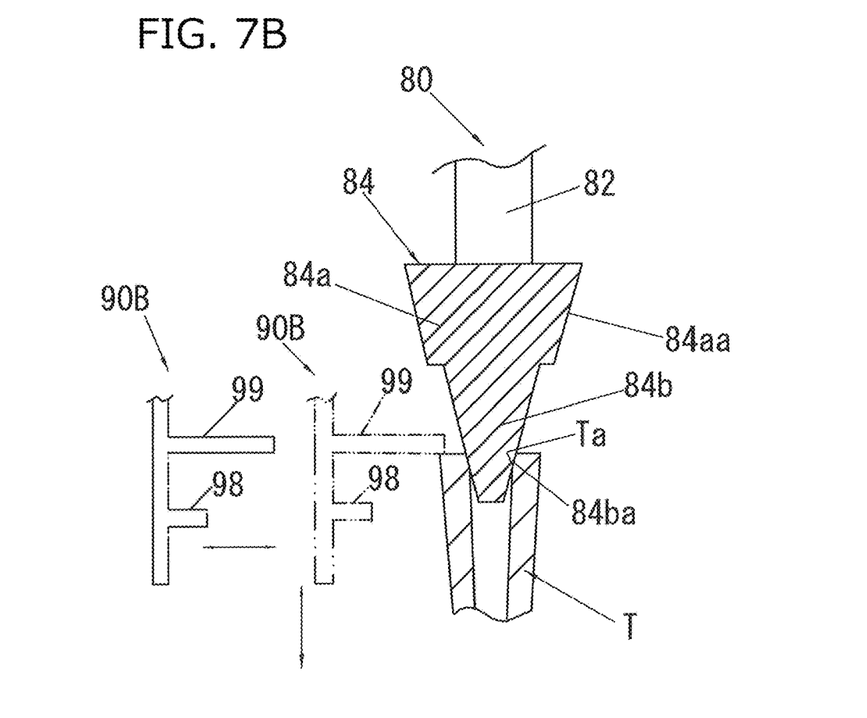
FIG. 7B is a view illustrating a state where a second removal portion removes the nozzle tip from the holding portion.

FIGS. 7A and 7B illustrate another example of a removal mechanism. As illustrated in the drawing, a removal mechanism 90B is capable of selectively removing the nozzle tip T and the reaction container C fitted onto and held by the holding portion 84. Specifically, the removal mechanism 90B includes a first removal portion 98 to remove the reaction container C to be attached to the first fitting attachment portion 84a of the holding portion 84, and a second removal portion 99 to remove the nozzle tip T to be attached to the second fitting attachment portion 84b. Then, when the removal mechanism 90B is slightly lowered in a state where the first removal portion 98 disengageably engages the fitting portion of the reaction container C attached to the first fitting attachment portion 84a of the holding portion 84 in a fitted state (refer to FIG. 7A), or in a state where the second removal portion 99 disengageably engages the fitting portion of the nozzle tip T attached to the second fitting attachment portion 84b of the holding portion 84 in a fitted state (refer to FIG. 7B), the nozzle tip T and the reaction container C can be removed from the holding portion 84. Alternatively, the holding portion 84 may be slightly raised. Incidentally, the removal mechanism 90B may be provided at a predetermined position in the analyte processing space at which the nozzle tip T and the reaction container C are to be removed, specifically, for example, at the tip and reaction container standby position III or in the reaction unit 40, or may be provided in the holding portion 84 itself of the instrument transfer unit 80.

According to such a removal mechanism 90B, the removal mechanism can be shared between the nozzle tip T and the reaction container C, and the efficiency of instrument removal work can be improved.

As described above, according to the automated analysis device 1 of the present embodiment, since the instrument transfer unit 80 forming the transfer mechanism includes the holding portion 84 to hold the nozzle tip T and the reaction container C, and the holding portion 84 includes the first fitting attachment portion 84a to be attachable to the reaction container C in a fitted state, and the second fitting attachment portion 84b to be attachable to the nozzle tip T in a fitted state, the instrument transfer unit 80 can be shared between the nozzle tip T and the reaction container C, and the nozzle tip T and the reaction container C can be transferred to a predetermined processing position in the limited processing space S efficiently and rapidly. Therefore, a structure and a transfer step of the transfer mechanism (transfer unit) can be simplified more, the degree of freedom in device design can be improved more, and the entire analysis process time can be shortened more than the case where instruments are transferred individually by corresponding transfer units of a transfer mechanism.

Incidentally, the invention is not limited to the above-described embodiment, and various modifications can be carried out without departing from the concept of the invention. For example, in the above-described embodiment, the nozzle tip T and the reaction container C are used for an analysis process, and are selectively held and transferred by the holding portion 84; however, the instruments to be used for the analysis process are not limited thereto. Such instruments may be appropriately changed according to the type of an analysis process. In addition, the configurations and the forms of the processing units of the analysis device are not also limited to those described above, and can be variously changed according to the application. In addition, in the above-described embodiment, the types of the instruments to be attached to the first and second fitting attachment portions 84a and 84b of the holding portion 84 are different from each other; however, the types may be the same.

Further, individual configurations described in the various embodiments described in the specification, such as the structure of the rack, the structure of the analyte or reagent holding portion, the conveyance unit to move and retrieve the rack, the reagent container lid opening and closing mechanism, the configuration where the analyte transfer line or the reagent transfer line is aligned with the uniaxial transfer line L1 or L2, and other individual configurations can also be extracted from each of the embodiments as needed, and combined appropriately.

In addition, the specific positions I to IX described in the embodiment are provided as an example, and can be appropriately changed to positions conforming to conditions required by the invention described in the specification.

What is claimed is:

1. An automated analysis device for obtaining measurement information on a predetermined analysis item by processing an analyte, and by measuring the processed analyte, the device comprising:
    a transfer unit comprising a transfer mechanism configured to transfer a first instrument and a second instrument into an analyte processing space, the first instrument having a first diameter and the second instruments having a second diameter wherein the first diameter is larger than the second diameter and wherein the first instrument and the second instrument are suitable for processing the analyte, wherein the transfer unit includes a holder configured selectively to hold the first instrument in a first fitted state or the second instrument in a second fitted state, wherein the first instrument and the second instrument are separate transfer targets, the holder including a first fitting attachment portion configured to attach to the first instrument in the first fitted state, and a second fitting attachment portion configured to attach to the second instrument in the second fitted state, the first instrument having a first upper end portion having a first inner peripheral tapered surface, the second instrument having a second upper end portion having a second inner peripheral tapered surface, the first fitting attachment portion having a first outer peripheral tapered surface tapering off to fit into the first inner peripheral tapered surface, and the second fitting attachment portion having a second outer peripheral tapered surface tapering off to fit into the second inner peripherical tapered surface.

2. The automated analysis device according to claim 1, wherein the first fitting attachment portion and the second fitting attachment portion are coaxially provided.

3. The automated analysis device according to claim 1, wherein the first fitting attachment portion and the second fitting attachment portion are integrally formed.

4. The automated analysis device according to claim 2, wherein the first fitting attachment portion and the second fitting attachment portion are integrally formed.

5. The automated analysis device according to claim 1, wherein the first instrument is a reaction container for dispensing the analyte into, and the second instrument is a nozzle tip to suction the analyte through.

6. The automated analysis device according to claim 2, wherein the first instrument is a reaction container for dispensing the analyte into, and the second instrument is a nozzle tip to suction the analyte through.

7. The automated analysis device according to claim 3, wherein the first instrument is a reaction container for dispensing the analyte into, and the second instrument is a nozzle tip to suction the analyte through.

8. The automated analysis device according to claim 4, wherein the first instrument is a reaction container for dispensing the analyte into, and the second instrument is a nozzle tip to suction the analyte through.

9. The automated analysis device according to claim 1, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

10. The automated analysis device according to claim 2, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

11. The automated analysis device according to claim 3, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

12. The automated analysis device according to claim 4, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

13. The automated analysis device according to claim 5, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

14. The automated analysis device according to claim 6, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

15. The automated analysis device according to claim 7, further comprising:
    a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

16. The automated analysis device according to claim 7, further comprising:

a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

17. The automated analysis device according to claim 8, further comprising:
   a removal mechanism to remove the first instrument held by the holder in the first fitted state and to remove the second instrument held by the holder in the second fitted state, wherein the removal mechanism includes a first removal portion to remove the first instrument from the first fitting attachment portion, and a second removal portion to remove the second instrument from the second fitting attachment portion.

\* \* \* \* \*